3,711,254
POTASH GRANULATION

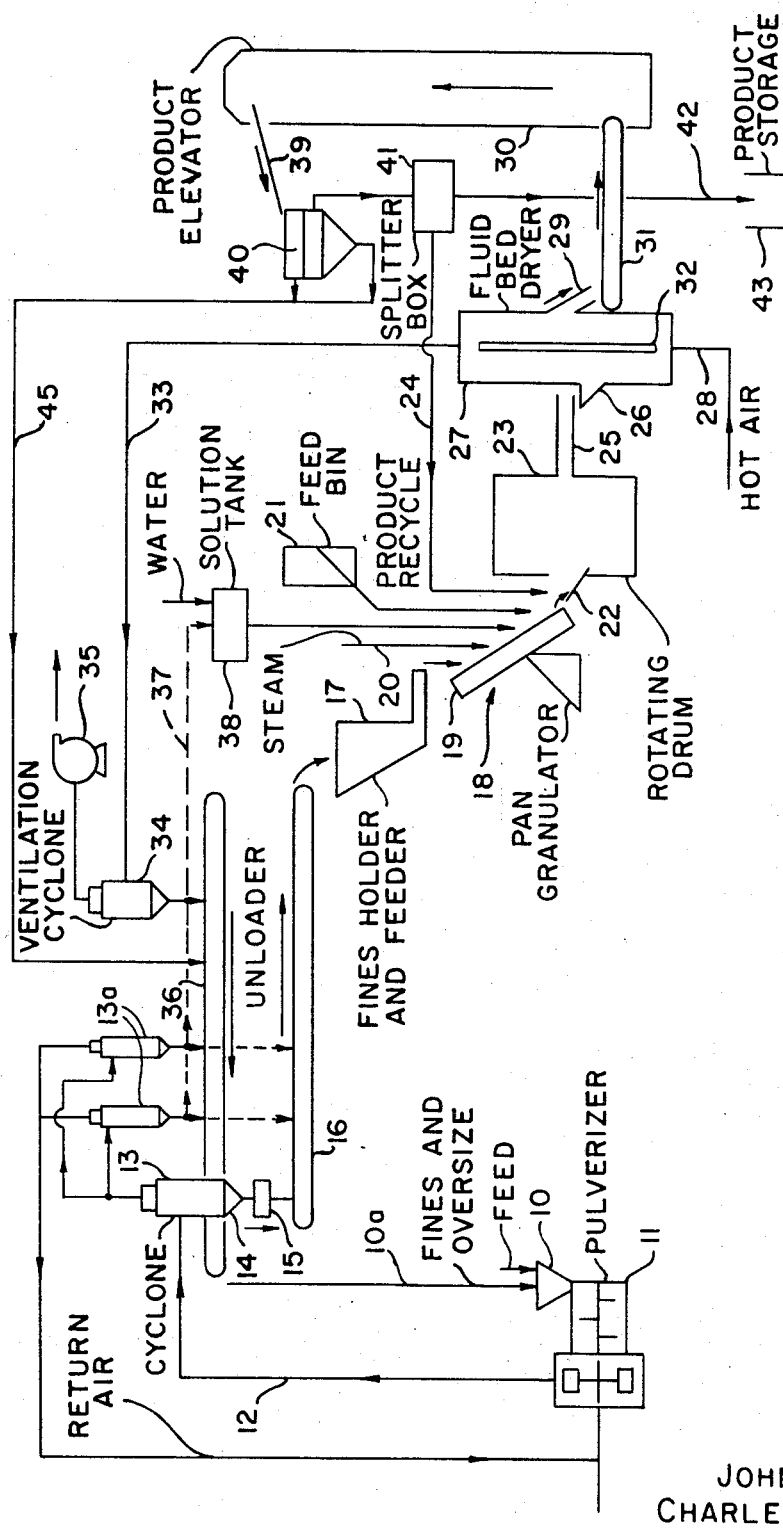

John McGowan and Charles Raymond Kirby, Rossland, and Henry Daniel Alexander Cormode, Trail, British Columbia, Canada, assignors to Cominco Ltd., Montreal, Quebec, Canada
Filed Feb. 25, 1970, Ser. No. 14,098
Int. Cl. C01d *3/22;* B01j *2/14*
U.S. Cl. 23—313                                            12 Claims

ABSTRACT OF THE DISCLOSURE

Particulate potash is granulated in a pan granulator. The moist granules from the pan are mixed with warm recycled dry granules and tumbled in a rotating drum whereby the granules become equilibrated in both moisture content and temperature. The equilibrated granules are dried in a fluid bed dryer and sized by screening. The oversize and undersize granules are recycled, via a pulverizer, to the pan and the product size granules go to storage. The recycled dry granules are either taken from the dryer discharge or from the product size granules going to storage. The final product is a granulated potash of improved bulk density, hardness and granule shape, which is suitable for use in bulk blend fertilizers.

BACKGROUND OF THE INVENTION

This invention relates to a process for the granulation of potash to improve its bulk density, hardness and particle shape; to an apparatus especially adapted for carrying out the novel process of the invention; and to the novel granulated potash produced by the said process.

The objects of the present invention are to economically improve the bulk density and hardness of potash in a granulated form whereby to increase the value of the potash as a fertilizer ingredient, while at the same time providing granules which are generally spherical and free of angular faces.

The product of the invention is particularly suitable for bulk blending with other fertilizer materials and comprises particulate potash granules having a bulk density of about 56 pounds per cubic foot poured and about 61 pounds per cubic foot packed and a Pfizer hardness of about 2.0 kg., said granules being generally spherical and free of angular faces, substantially all said granules being sized between −6 mesh and +14 mesh as measured with Tyler Standard Screens.

SUMMARY OF THE INVENTION

The process of the invention may be generally defined as comprising the steps of granulating particulate potash material in a pan granulator to form moist potash granules, mixing said moist granules with recycled potash granules having a temperature above the temperature of said moist granules to equilibrate the moist granules with the recycled granules in moisture and temperature, drying the equilibrated granules, dividing the granules from the dryer into a fraction comprising the potash granules recycled to the mixing step, a fraction comprising offsize potash granules, and a fraction comprising product-size potash granules, and recovering the last named fraction as product.

The apparatus of the invention may be generally defined as comprising an air-swept pulverizer, a series of cyclones connected to said pulverizer, a pan granulator, means for feeding the solids product of said cyclones to said granulator, means for feeding ungranulated potash particles to said pan granulator, means for feeding water or an aqueous solution and means for feeding steam to said pan granulator, a rotating drum arranged to receive granulated product from said granulator, a fluid bed dryer, means for dividing the dried granulated potash material into a product fraction, a product recycle fraction and a fraction containing granules of undesired size, means for conveying the last mentioned granules from said dividing means to said pulverizer, and means for conveying the product recycle fraction to said rotating drum.

BRIEF DESCRIPTION OF THE DRAWING

The attached drawing shows the flow of materials and schematically illustrates a preferred arragement of equipment for use in a presently preferred embodiment of the process according to the invention for making the novel granulated potash product of the invention.

DETAILED DESCRIPTION

Fertilizer grade potash particles obtained from processes for the recovery of potash from potash minerals are fed thruogh a hopper 10 into a pulverizer, such as an air-swept swing hammer mill 11.

Where the potash fed to the process of this invention comprises a flotation concentrate, satisfactory potash granules can be obtained by granulating the milled, potash flotation-concentrate. However, it might be desired to remove the residual flotation reagent present on the surface of the flotation concentrate particles. This removal can be effected by any one of a number of methods. A convenient method is roasting the concentrate at temperatures above 200° C. prior to feeding the potash particles to hopper 10. Fines and over-size fractions produced at later stages during the process are also fed into the hopper 10 via line 10a. The product of the mill 11 is carried off in a stream of air along line 12 to a two-stage system for removal of fines and dust comprising a primary cyclone 13 and two secondary cyclones 13a. The material recovered at the base 14 of cyclone 13 is fed via an unloader 15 to a screw conveyor 16. The material recovered from the bottoms of secondary cyclones 13a is discharged onto belt 36 for return to mill 11, to conveyor 16, or along line 37 to solution tank 38 as required, as indicated by the dotted lines in the attached drawing.

The conveyor 16 carries the finely divided material, comprising usually about 50–80% particles of −325 mesh, to a fines holder and feeder 17 whose outlet is disposed above a pan granulator 18. Pan 19 of the pan granulator 18 is rotatably disposed at an adjustable angle. A feed bin 21 containing relatively coarse nucleating material, e.g., "coarse grade" potash, is disposed above the pan 19, and is arranged to feed this material to the pan 19 at a controlled rate throughout the operation of the process. The fines holder and feeder 17 is also arranged to feed the finely divided material to the rotating pan at a controlled rate throughout the operation of the process. It is presently preferred to have the bin 21 supply from about 10% to about 40% of the solids treated on the pan 19, whilst the fines feeder 17 supplies the remainder. It is to be understood that other potash materials such as the undersize material from screen 40, or, for example, "standard grade" potash can be used as nucleating material in the granulation process in pan 19.

As these solids cascade over the rotating surface of the pan 19, liquid is sprayed on to them to build up the granules and to bind them in their granular form until drying takes place. The presently preferred liquid is an aqueous solution of potash (KCl), which contains about 30 lbs. of KCl per 100 lbs. of water. While an aqueous solution of potash is preferred, other compounds may be used to make the aqueous solution, examples being phosphoric acid, ammonium phosphate, sodium silicate, sodium hexametaphosphate, and a mixture of potash and phosphoric acid. The aqueous solution is added through conventional spray nozzles. In addition to the aqueous solution, steam from steam line 20 may be added to the particles being treated in the pan 19. The steam is used to raise the operating temperature of the pan, but it also, of course, provides part of the moisture requirements. The rate of addition of the aqueous solution is controlled by the pan operator who judges the amount of moisture required to give good granulation, making suitable adjustments for any changes in the solids feed ratio. The operator's task is facilitated by the provision or a by-pass system (not shown) for the aqueous solution. The pan 19 is provided with conventional plows to scrape the bottom and sides of the pan and distribute the cascading granules over the pan's surface.

In the presently preferred operation of the pan granulator 18, both fines and coarse feed are separately fed onto the surface of the pan 19 at about the 5 o'clock position with the pan rotating clockwise when viewed from above. The aqueous solution of KCl is added from two or three spray nozzles located inwardly of the 3 o'clock position while steam may be added from a sprayer located at about the 8 o'clock position. Three plows are arranged at, and generally inward of, the one o'clock position. These plows are arranged to scrape the bottom and sides of the pan 19 and distribute the cascading granules over the pan's surface.

The moist granules discharge over the outer rim of the pan 19 into a chute 22 leading to a cylindrical rotating drum 23. The pan 19 may be provided with a re-roll ring (not shown). In this case, the granules would, of course, be discharged into the re-roll ring and pass from the ring to the chute 22. The moisture content of the granules leaving the pan granulator 18 is preferably kept below about 14% because we have found that higher moisture contents result in decreased efficiency. As the moist granules pass down the chute 22 and into the rotating drum 23, they are mixed with dry, recycled product-size granules having a temperature above the temperature of the moist granules from pan 19, which have been fed to the chute along the line 24 from a source to be described later on in this specification. Alternatively, if the pan 19 has a re-roll ring (not shown), the recycled, product-size granules may be added to the re-roll ring instead of the chute 22.

Although we have obtained the best improvements in the properties of the final product by recycling product-size material to the equilibration step in the drum it is considered to be within the scope of the process according to the invention to recycle material to the drum having particle sizes other than product size.

With regard to the feed to the rotating drum 23, it is presently preferred to maintain the ratio of moist granules (from pan granulator 18) to warm, dry, recycled granules (from line 24) at 1:1. We have, however, satisfactorily operated the process with said ratios ranging from 2:1 to 1:2. The moist and dry granules are mixed together and tumbled within the drum 23 and become equilibrated both in temperature and in moisture content.

Passage of the granules through drum 23 serves to improve bulk density. This improvement is believed to be attributable to the use of the drum in conjunction with warm recycle material, leading to smoother granules which exhibit better packing qualities. That the drum serves this purpose is illustrated in the operating examples in which the effect of recycle is shown and by visual examination of the product. Relatable changes in porosity have also been shown to occur when recycle rates to the drum are increased. Changes in porosity account for about ¼ to ⅓ of the increase in bulk density measured, and, because the shape of the granules as such is similar with and without recycle, the balance of the increase apparently should be attributed to changes in surface smoothness which allow a closer packing.

The observable changes in the granules leaving the drum are that they are equilibrated in moisture and that their temperature is between that of the warm, dry recycled granules and that of the moist ones. It appears that a transfer of solution occurs under essentially non-drying conditions. In the early part of the recycled granules' history in the drum, they are hard and dry and could to some extent knead the moist granules to a smoother surface finish. Later, the entry of solution into the recycled granules will allow them to undergo porosity reduction when the solvent evaporates in the dryer. A further possible mechanism is that since solution leaves the moist granules in the drum whilst they are subject to the forces within the cascading bed, they may be thereby subjected to a small amount of internal or subsurface rearrangement which would also contribute to reduced porosity.

In summary, while the process within the drum is not fully understood and we do not wish to be bound by the theoretical explanations just provided, nevertheless the observable and measurable effects are increased bulk density, increased particle hardness, improved surface smoothness and reduced product porosity. These desirable properties come about as a result of mixing, within a plain drum, moist granules from the pan and a supply of warm, dry granules.

While a drum granulator might be substituted for the pan granulator 18, the latter is preferred because it is easier to control and to clean, and because it gives superior classification.

In the illustrated process, the materials which have been equilibrated in the drum 23, i.e., the equilibrated granules, are continuously discharged via outlet 25 into the inlet 26 of a fluid bed dryer 27 wherein the granules are dried with hot air which passes upwardly through the dryer, hot air being fed in through pipe 28. The fluid bed dryer has an outlet 29 through which the dried granules pass by gravity and from which they are transported to a bucket elevator 30 by means of a conveyor 31. The fluid bed dryer is preferably provided with a vertical baffle 32 interposed between the inlet 26 and the outlet 29, the baffle being so disposed that the granules must pass under it on their way to the outlet 29. The hot gases from the fluid bed dryer leave the top of the dryer and pass along line 33 and into a ventilation cyclone 34. The top of cyclone 34 is connected to a fan 35 which discharges the gases to the atmosphere. Fines collected at the base of the cyclone 34 drop onto a conveyer 36. Fines leaving the discharge end of the conveyor 36 pass along the line 10a into the hopper 10 of the swing hammer mill 11.

While a rotary dryer might be used instead of the fluid bed dryer, the latter is preferred because it causes less breakdown of granules and permits better control of product quality.

In the case where the aqueous solution sprayed upon the particles in the pan granulator 18 is a KCl solution, a fraction of the fines collected in the base of cyclones 13a or 34 is drawn off before reaching the conveyor 36. This fraction is fed along line 37 into the solution tank 38, wherein it is mixed with additional water, and then fed at a controlled rate, selected by the pan granulator operator, onto the surface of the granules cascading down the rotating face of the pan 19.

In the preferred embodiment of the invention the granules carried from the fluid bed dryer by the conveyor 31 are elevated by bucket elevator 30 and, according to this preferred embodiment, via chute 39 into a set of oscillating screens 40 wherein the granules are separated into an on-size fraction, an over-size fraction and an under-size fraction, the on-size fraction being granules which lie in the range −6 mesh to +14 mesh (−6+14M, Tyler Standard Screens). The on-size fraction, i.e., the one within the size range just mentioned, is fed to a splitter box 41 wherein a split is effected, one split portion being sent along line 42 to a product storage 43 whilst the other split portion is directed along line 24 to the chute 22 leading from the pan granulator to the rotating drum. Here the warm, dry, recycled product mixes with moist granules which have been produced in the pan granulator and, as previously noted, the dry and the moist granules are mixed and tumbled together in the rotating drum 23 until they are equilibrated with respect to both moisture content and temperature. We have found that cooling the material recycled to the drum is unnecessary and that it is advantageous to feed the recycled material to the drum at an elevated temperature, i.e., at a temperature above the temperature of the moist granules from the pan granulator.

The treated particles of undesired size, i.e., the over-size and under-size fractions from the oscillating screens 40, are fed along the line 45 to the conveyor 36 where they join with the fines from the ventilation cyclone 34, and with at least a portion of the dust from the cyclones 13a, and then pass along the above-mentioned line 10a into the hopper 10 of the mill 11.

Although the process and product according to the invention are mainly directed to a product in the −6+14M size range, it is understood that other product size ranges are within the scope of the invention.

We have achieved good results when treating potash recovered by flotation from Canadian ores, using equipment of the nature described above and operating under the conditions which will now be set out.

In most cases the potash was roasted at temperatures above about 235° C. to eliminate residual flotation reagent. The feed was milled in the pulverizer 11 along with (a) recycled screen over-size and under-size and (b) the ventilation cyclone underflow.

The solids fed to the pan granulator 18 comprised from about 10% to 40% relatively coarse potash crystals from bin 21 and from about 90% to 60% fines from fines feeder 17. The pan 19 had a diameter of 39″ and was revolved at about 30 r.p.m., the pan being at an angle of about 60° from the horizontal. An aqueous solution of KCl was sprayed onto the material being processed in the pan granulator and steam was added as required. The aqueous solution of KCl, containing 30 lbs. KCl/100 lbs. $H_2O$, was prepared by withdrawing a sufficient amount of cyclone underflow from cyclones 34 and/or 13a and adding water to obtain the desired strength of solution. The moisture content of the granules leaving the pan 19 was about 14%. The ratio of product recycle to moist granules fed to the rotating drum 23 was 1:1. The rotating drum had a diameter of 22½″. It was about 60″ long and was rotated at 22 r.p.m. The fluid bed dryer was operated at a temperature of about 250° C.

The granulated product of the invention, being spherical and substantially free of angular faces and having a bulk density of from about 53 to 59 pounds per cubic foot (lb./ft.$^3$) poured and from about 57 to 63 lb./ft.$^3$ packed, is particularly suitable for mixing with other granular fertilizer materials, since the latter usually have bulk densities in the ranges of 53–60 lb./ft.$^3$ poured and 60–67 lb./ft.$^3$ packed. The hardness of the granulated product of this invention, which is from about 1.7 to 2.6 kg., as measured with the Pfizer Hardness Tester, insures that there will be little breakdown of the potash granules and therefore little potash dust when the granulated potash particles of the invention are mixed with other fertilizer materials in bulk blends.

The nature of the invention and the effects of making changes in various steps in the process will now be illustrated by describing, by way of example, a number of experiments conducted with the apparatus described above and illustrated in the accompanying drawing.

The chemical and physical data concerning the materials treated are listed in Table I.

TABLE I.—CHEMICAL AND PHYSICAL DATA

| | Percent | | | |
|---|---|---|---|---|
| | $K_2O$ | MgO | $Na_2O$ | $SO_4$ |
| Typical assays: | | | | |
| Fines feed | 60.5 | 0.08 | 1.3 | 0.19 |
| Coarse nucleating material | 61.2 | 0.11 | 1.2 | 0.09 |
| Product | 60.8 | 0.09 | 1.4 | 0.14 |

| | Percent | |
|---|---|---|
| | Normal range | Preferred range |
| Screen analyses: | | |
| Fines feed: | | |
| +200M | 5–20 | Less than 15. |
| +325M | 20–50 | 20–30. |
| −325M | 50–80 | 70–80. |
| Coarse nucleating material: | | |
| +10M | 20–40 | Low end.[1] |
| +12M | 30–50 | |
| +14M | 53–70 | |
| +20M | 87–95 | |
| −20M | 5–13 | Do.[1] |

[1] This has not been determined absolutely, but too much large or small nucleating material can be detrimental. The process can operate with the bulk of the nucleating material between 14 and 20 mesh or, if desired, between 8 mesh and 14 mesh.

EXAMPLE 1

Unroasted feed

The process was operated using feed comprising unroasted, milled, standard grade potash fines feed and unroasted coarse grade potash for nucleation. The materials, milled and screened as described above, were fed to the pan at a nominal feed rate of approximately 650 lb./hr. Of this, about 25 lb./hr. came from solution. The feed rate of unroasted coarse grade nucleation material was 65 lb./hr. The product was split so that a rate of approximately 700 lb./hr. was recycled to the drum. The dryer was operated nominally at 250° C. Granulation was considered fair to good, with 86% of the pan discharge in the −6+14M size. The product hardness was measured between 2.2 and 2.6 kg. Bulk density was around 56 lb./ft.$^3$ poured, 61 lb./ft.$^3$ packed. This example shows that it is possible to make a granulated potash with satisfactory physical properties without prior removal of the residual flotation reagent.

The operating and sample data are listed in Table 2.

Table 2.—Operating data

Feed to pan (nominal values):
  Milled unroasted standard _____lb./hr__ 560
  Unroasted coarse grade for nucleation _lb./hr__ 65
  Potash from solution (30 lb. KCl/100
    $H_2O$) _____lb./hr__ 25
                                                  ———
  Total _____lb./hr__ 650

Recycle to drum at 95° C. _____lb./hr__ 700
Dryer temperature _____° C__ 245
Drum temperature _____° C__ 60
Moisture content:
  Pan discharge _____percent__ 12.8
  Drum discharge _____do____ 5.5
Granule size fraction −6+14M:
  Pan discharge _____percent__ 86
  Drum discharge _____do____ 94
Product _____lb./hr__ 370–510
O/S+U/S (oversize and undersize) __lb./hr__ 130–140
Ventilation cyclone underflow _____lb./hr__ 75–125
Product data (average values):
  Bulk density poured _____lb./ft.$^3$__ 56
  Bulk density packed _____lb./ft.$^3$__ 60.5
  Hardness (Pfizer) _____kg__ 2.4
  Cumulative screen analysis:
    +6 mesh _____percent__ 1.2
    +8 mesh _____do____ 71.0
    +10 mesh _____do____ 94.0
    +12 mesh _____do____ 97.0
    +14 mesh _____do____ 99.7

EXAMPLE 2

Effect of the rate of recycle to the drum

The process was operated to study the effect of various amounts of recycled material to the drum. The operation commenced without recycled. Recycle was then used at 400, 700 and 1100 lb./hr. The total feed rate was set at a nominal 650 lb./hr. The operating and product data are shown in Table 3.

TABLE 3

OPERATING DATA

| | |
|---|---|
| Feed to pan (nominal values), lb./hr.: | |
|   Milled, roasted standard grade | 560 |
|   Roasted coarse grade for nucleation | 65 |
|   Potash from solution (30 lb. KCl/100 lb. H₂O) | 25 |
|     Total | 650 |
| Recycle to drum, at 80 to 100° C., lb./hr. between | 0–1,100 |
| Dryer temperature, ° C | 200 |
| Drum temperature, ° C | 40–60 |
| Moisture content, percent: | |
|   Pan discharge | 12.4–12.9 |
|   Drum discharge | 4.6–12.4 |
| Product, lb./hr | 390–420 |
| O/S + U/S, lb./hr | 95–150 |
| Ventilation cyclone underflow, lb./hr | 90 |

PRODUCT DATA (Average values)

| Recycle, lb./hr. | Bulk density, lb./ft.³ Poured | Bulk density, lb./ft.³ Packed | Hardness, kg., Pfizer | +6 M | +8 M | +10 M | +12 M | +14 M |
|---|---|---|---|---|---|---|---|---|
| 0 | 50.9 | 54.9 | 1.7 | 2.1 | 68.4 | 95.8 | 97.5 | 99.3 |
| 400 | 54.8 | 60.2 | 2.1 | 1.6 | 55.0 | 91.4 | 96.3 | 99.5 |
| 700 | 56.8 | 61.5 | 2.1 | 0.6 | 58.0 | 93.0 | 97.0 | 99.7 |
| 1,100 | 57.3 | 62.7 | 2.2 | 0.4 | 33.0 | 89.0 | 97.0 | 99.7 |

The data in Table 3 show that with no recycle to the drum, a product was made which had a bulk density of about 51 lb./ft.³ poured, 55 lb./ft.³ packed, and which had a hardness of 1.7 kg., and that by recycling an amount of warm product granules to the drum the bulk density and the hardness of the final product is improved considerably.

By increasing the amount of recycle to the drum to 400, 700 and 1100 lb./hr. respectively, the bulk density of the final product increased progressively to 57.3 lb./ft.³ poured, 62.7 lb./ft.³ packed and the hardness increased to 2.2 kg.

EXAMPLE 3

Effect of dryer operating temperatures

This example illustrates that the drying process in the fluid-bed dryer is operable over a wide range of dryer temperatures. The preferred temperature range is from about 200° C. to about 300° C.

Comparing the results of a first test run, using a dryer temperature of about 310° C., with the results of a second test run using a dryer temperature of about 200° C. showed that the product of the second test run had a slightly lower bulk-density and hardness.

When the dryer temperature was reduced to 120° C. the bulk-density dropped to around 53 lb./ft.³ poured and 58 lb./ft.³ packed and the product hardness to around 1.7 kg. (from around 55 lb./ft.³ and 60.5 lb./ft.³ and a hardness of 1.9 kg. at 300° C. respectively).

Operating at a dryer temperature of 300° C. the temperature of the material in the drum was 54° C., while operating at 120° C. the temperature of the material in the drum dropped to 33° C. The moisture content of the drum discharge was 7.5% and 10.5% respectively. In all runs a recycle to the drum of 700 lb./hr. was maintained. Dryer temperatures of above 300° C. are feasible, but their application would be more costly both in operating costs and capital investment. When roasted feed material is used, the dryer temperature should be at the higher end of the preferred temperature range.

EXAMPLE 4

Effect of feed rate and size of nucleating material

The process was operated to investigate the effects of size and quantity of nucleating material. The unit was started up on a nominal feed rate of 650 lb./hr. but without adding nucleating material. After only 20 minutes of operation the material discharging from the pan was the size of marbles and only oversize material was produced.

The feed rate of nucleating material (−8+20M) was then adjusted to 300 lb./hr. to assess the effect of an excessive amount of nucleating material. Within 5 minutes the majority of the product leaving the pan was smaller than desired; the bulk density of the product so made was 56.0 lb./ft.³ poured, 61.7 lb./ft.³ packed, and the hardness was 1.6–1.7 kg. The drum recycle rate was 700 lb./hr. and the dryer temperature around 220° C.

A portion of coarse grade nucleating material was split into +12M and −12M fractions to study the effect of the size of the nucleating material. It was found that it was possible to use the larger material as nucleant, but the product contained a very high proportion in the −6+8M fraction, i.e., 65%. By raising the nucleating rate from about 120 lb./hr. to 240 lb./hr. the −6+8M fraction in the product comprised 58%; the bulk density was 54.3 and 58.8 lb./ft.³ poured and packed respectively and the hardness was about 2.3 kg.

When the process was operated with −12M nucleating material the product became much smaller and the amount of nucleating material was much reduced (to around 90 lb./hr.); the bulk density was around 53.5 lb./ft.³ poured and 57.8 lb./ft.³ packed, and the hardness was about 1.7 kg. The −6+8M fraction in the product was just over 30%.

This example indicates that, to produce fertilizer sized particles from the pan granulator, the use of nucleating material is required. It also shows that the size of nucleant is important. The +12M, −12M split used for the nucleating material was chosen for convenience and is not intended to indicate a preferred size.

Satisfactory results are obtained with nucleating material which is in the −8+20M range.

The operating and sample data are set out in Table 4.

TABLE 4

OPERATING DATA

| | | | |
|---|---|---|---|
| Feed to pan (nominal values), lb./hr | | | 650 |
| Nucleation with about 12M coarse grade | (1) −12M 90 lb./hr. | (2) +12M 120 lb./hr. | (3) +12M +240 lb./hr. |
| Potash in solution, lb./hr | | | 25 |
| Recycle to drum ² | | | |
| Dryer temperature, ° C | | | 220 |
| Drum temperature, ° C | | | 32–38 |
| Moisture content | (1) 90 lb./hr. −12M | (2) 120 lb./hr. +12M | (3) 240 lb./hr. +12M |
|   Pan discharge, percent | 14.3 | 13.0 | 11.9 |
|   Drum discharge, percent | 9.2 | 8.6 | 8.2 |
| Granule size-fraction −6,+14M | (1) | (2) | (3) |
|   Pan discharge, percent | 97.3 | 74.4 | 97.8 |
|   Drum discharge, percent | 95.5 | 86.0 | 98.0 |
| Product, lb./hr | | | Nil ¹–630 |
| O/S + U/S, lb./hr | | | ² 170–600 |
| Ventilation cyclone underflow, lb./hr | | | 120–210 |

¹ No nucleation.
² Not actually measured.

PRODUCT DATA

| Nucleating material | | Bulk density, lb./ft.³ | | Hardness, kg., Pfizer | Screen analysis, percent, −6,+14M |
|---|---|---|---|---|---|
| Mesh size | Lb./hr. | Poured | Packed | | |
| −12M | 90 | 53.5 | 58.0 | 1.7 | 99.0 |
| +12M | 120 | 54.3 | 58.8 | 2.3 | 98.0 |
| Coarse | 210 | 55.6 | 60.6 | 1.5 | 98.9 |
| +12M | 240 | 54.4 | 58.8 | 1.5 | 98.5 |
| Coarse | 300 | 56.0 | 61.6 | 1.7 | 99.0 |
| None added | | | | | 100%+6M |

EXAMPLE 5

Effect of feed rate to the pan granulator

Except for those tests in which the feed rate of nucleating material was varied, as shown in Example 4, all the work ememplified above was performed at a nominal feed rate to the pan to around 650 lb./hr.

Additional work was done to determine the effect of the use of increased feed rates to the pan granulator. The amount of warm, dry, product size recycle to the drum was adjusted accordingly.

Nucleating material was fed to the pan at a rate of about 200 lb./hr. The material in the drum varied in temperature from the about 50 to 65° C. and the dryer was operated at about 235° C.

The operating and sample data are tubulated in Table 5. These data illustrate the flexibility of the process regarding the amounts of feed and recycle, and indicate that the process can be operated successfully, using the equipment as described, at feed rates as high as 1500 lb./hr. to yield a product with the desired physical properties.

namely an on-size fraction, an under-size fraction and an over-size fraction, in which the under-size fraction and over-size fraction are fed to a pulverizer to ready them for reprocessing while the on-size fraction is further subdivided, one division being fed to product storage while the other comprises the recycled potash granules.

6. A process as defined in claim 1, in which the finely divided potash which is fed to the pan granulator is obtained by pulverizing ungranulated potash particles, together with granulated potash material, in the air-swept pulverizing mill, fractionating the pulverized material in a cyclone into a dust fraction and a fines fraction and feeding said fines fraction to the pan granulator.

7. A process as defined in claim 1, in which the finely divided potash which is fed to the pan granulator is obtained by pulverizing ungranulated potash particles, together with granulated potash material, in an air-swept pulverizing mill, fractionating the pulverized material into a dust-fraction and a fines fraction, feeding said fines fraction to the pan granulator and recovering the dust fraction in secondary recovery means.

TABLE 5

| | Operating data | | | | | Screen analysis | | Product data | | | |
|---|---|---|---|---|---|---|---|---|---|---|---|
| Test Run No. | Feed to pan, lb./hr. | Recycle to drum, lb./hr. | Product recovered, lb./hr. | O/S + U/S, lb./hr. | Vent. cyclone, lb./hr. | Pan discharge, percent, −6, +14M | Drum discharge, percent, −6, +14M | Bulk density, lb./ft.³ | | Hardness, kg. Pfizer | Screen analysis, percent, −6, +14M |
| | | | | | | | | Poured | Packed | | |
| 1 | 650 | 700 | 400 | 120 | 90 | 97 | 98 | 57.0 | 61.0 | 2.1 | 99.0 |
| 2 | 1,050 | 950 | 680 | 180 | 180 | 95 | 95 | 54.5 | 59.5 | 2.0 | 99.0 |
| 3 | 1,500 | 1,100 | 770 | | | 93 | 94 | 54.5 | 59.0 | 2.2 | 98.8 |
| 3a* | 1,500 | 1,500 | 1,050 | | | 85 | 90 | 55.8 | 60.7 | 2.2 | 99.0 |
| 4 | 1,800 | 1,500 | 720 | 850 | 290 | 70 | 87 | 54.6 | 59.6 | 2.1 | 98.8 |

*After having operated at the feed rate and recycle rate as used in test run No. 3, it became apparent that the recycle rate of 1100 lb./hr. was too low and the rate was increased to 1500 lb./hr. This adjustment enabled steady operation, i.e., the amounts of product and off-size material were in line with the conditions created by the increased feed rate.

The embodiments of the invention in which an exclusive property or privilege is claimed are defined as follows:

1. A continuous process for the granulation of potash whereby a granular potash is obtained with improved bulk density, hardness and particle shape, comprising the steps of feeding finely divided potash, coarse nucleating potash, and water or an aqueous potash solution to the pan of a pan granulator, granulating said potash material in said pan granulator to form moist potash granules, withdrawing said granules from the granulating step, mixing said moist granules with recycled potash granules having a temperature above the temperature of the said moist granules to equilibrate the moist granules with the recycled granules in moisture and temperature, drying the equilibrated granules, dividing the granules from the drying step into a fraction comprising off-size potash granules sized between about −6 and 14 mesh Tyler Standard Screens, and a fraction comprising product-size potash granules, recycling a portion of said product-size potash granules to the mixing step to provide said recycled potash, and recovering a portion of said product-size granules as product.

2. A process as defined in claim 1 in which moist granules from the granulating step and the recycled potash granules having a temperature above the temperature of the moist granules are fed into a rotating drum.

3. A process as defined in claim 1 in which the recycled potash granules have a temperature in the range of about 70 to 120° C.

4. A process as defined in claim 1, in which the drying step is carried out in a fluid bed dryer, at a temperature between about 200° C. and about 300° C., utilizing heated air as the fluid which is passed through the bed.

5. A process as defined in claim 1 in which said dividing of the granules is carried out on at least one oscillating screen which divides the granules into three fractions, 8. A process as defined in claim 1, in which the ratio between the amount of moist granules from the pan granulator and the amount of recycled potash granules is from 2 to 1 to from 1 to 2.

9. A process as defined in claim 1, in which the ratio between the amount of recycled potash granules recycled and the amount of moist granules from the pan granulator is about one to one.

10. A process as defined in claim 1 in which the nucleating potash is sized −8 mesh to +20 mesh, Tyler Standard Screens.

11. A process as defined in claim 1 in which the potash fed to the pan comprises about 10% to about 40% coarse potash and about 90% to about 60% finely divided potash.

12. A process for the granulation of potash whereby a granular potash is obtained with improved bulk density, hardness and shape comprising the steps of feeding separately a major portion of finely divided potash; a minor portion of coarse nucleating potash; and a quantity of water or an aqueous solution onto the surface of an angularly disposed rotating pan granulator; mixing the potash particles and the water or aqueous solution delivered to said pan granulator through continued rotation of said granulator, whereby to granulate said particles; feeding the resulting moist granules together with warm, dry, potash granules into a rotating drum; tumbling said moist and dry granules together within said drum until the granules from both sources are equilibrated in temperature and moisture content; drying the equilibrated granules, transporting the dried granules to a dividing means including an oscillating screen which divides the granules into three fractions, namely an on-size fraction sized between about −6 and 14 mesh Tyler Standard Screens, an under-size fraction and an over-size fraction, in which the under-size fraction and the over-size fraction are fed to a pulverizer to ready them for reprocessing while the on-size fraction is further sub-divided, one division being fed to product storage while the other comprises the recycled potash granules.

References Cited
UNITED STATES PATENTS

| | | | |
|---|---|---|---|
| 3,092,489 | 7/1971 | Smith | 23—313 |
| 2,979,421 | 4/1961 | Rissman | 23—313 |
| 3,427,145 | 2/1969 | West | 23—313 |
| 3,471,267 | 10/1969 | Capes | 23—313 |
| 3,466,161 | 9/1969 | Perlmutter | 23—313 |
| 3,440,033 | 4/1969 | Vasar | 23—313 |
| 3,097,075 | 7/1963 | Vandenhoeck | 23—313 |
| 3,026,194 | 3/1962 | Smith | 23—313 |
| 3,048,478 | 9/1962 | Smith | 23—313 |

NORMAN YUDKOFF, Primary Examiner

S. J. EMERY, Assistant Examiner

U.S. Cl. X.R.

23—89, 301 R, 302; 264—117